United States Patent [19]

Schwing

[11] Patent Number: 4,472,118
[45] Date of Patent: Sep. 18, 1984

[54] MULTI-WAY VALVES FOR PUMPS FOR CONVEYING HEAVY FLOWABLE MATERIALS

[75] Inventor: Friedrich Schwing, Herne, Fed. Rep. of Germany

[73] Assignee: Friedrich Wilh. Schwing GmbH, Herne, Fed. Rep. of Germany

[21] Appl. No.: 364,617

[22] Filed: Apr. 1, 1982

[30] Foreign Application Priority Data

Apr. 4, 1981 [DE] Fed. Rep. of Germany ....... 3113787

[51] Int. Cl.³ ............................................. F04B 15/02
[52] U.S. Cl. ................................... 417/517; 417/519; 417/532; 417/900
[58] Field of Search ............... 417/516, 517, 518, 519, 417/532, 900; 251/357

[56] References Cited

U.S. PATENT DOCUMENTS 4,179,003 12/1979 Cooper et al. ........................ 384/94
4,277,109 7/1981 Crow ..................................... 384/94
4,373,875 2/1983 Schwing ............................... 417/900

FOREIGN PATENT DOCUMENTS 233965 6/1964 Australia .
62766 10/1982 European Pat. Off. .
975163 9/1961 Fed. Rep. of Germany .
1292976 11/1963 Fed. Rep. of Germany .
1214495 4/1966 Fed. Rep. of Germany .
1278247 9/1968 Fed. Rep. of Germany .
1812500 6/1970 Fed. Rep. of Germany .
2614895 10/1977 Fed. Rep. of Germany .
2933128 8/1979 Fed. Rep. of Germany ...... 417/900
2829181 1/1980 Fed. Rep. of Germany ...... 417/900

OTHER PUBLICATIONS

Trutnovsky, Ing K., Konstruktion Im Maschinen-Apparate-Und Geratebau, vol, 20, No. 6, 1968, pp. 202-206.

Primary Examiner—Carlton R. Croyle
Assistant Examiner—Timothy S. Thorpe
Attorney, Agent, or Firm—Kinney & Lange

[57] ABSTRACT

The valve has a shutter mechanism which is movable within a housing and is provided at one end with at least one inlet which is movable across one or more housing openings and at the opposite end with an outlet surrounded by a sealed contact joint which is movable across a delivery pipe opening in the housing. This sealed contact joint surrounds the delivery pipe opening in the housing and contacts either the inside wall of the housing or a face plate arranged on the inside wall of the housing in all intermediate and final positions of the shutter mechanism. With the aim of reducing wear and producing a permanent seal, the sealed contact joint is in the form of a compressible sealing ring with a slotted or kidney-shaped cross-section which serves to wipe the flat and smooth face plate or inside wall of the housing. Moreover the compressible sealing ring is loaded with the internal pressure of the shutter mechanism and is supported outwardly by a flange surrounding the outlet and extending in the conveying direction.

7 Claims, 4 Drawing Figures

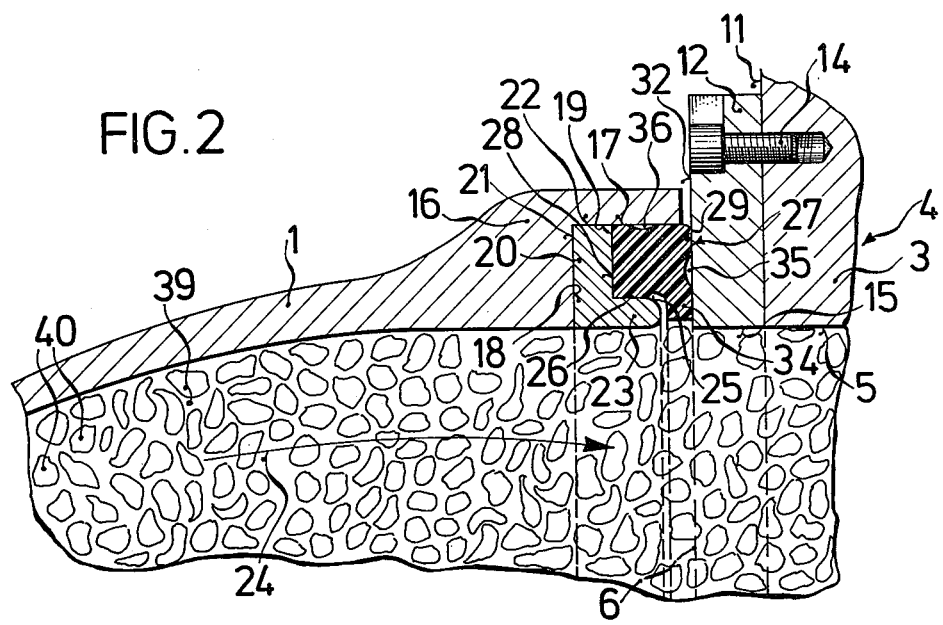
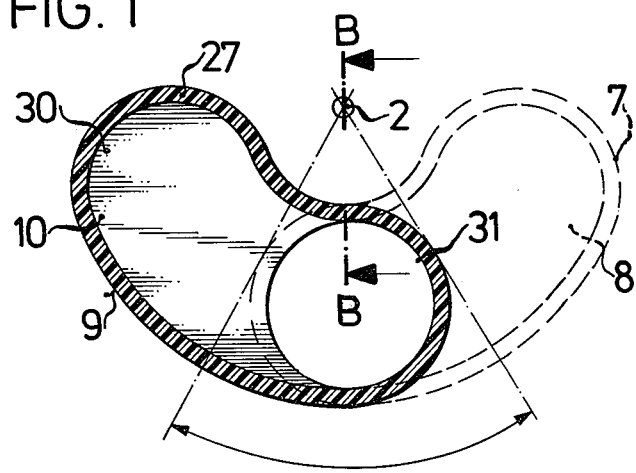

MULTI-WAY VALVES FOR PUMPS FOR CONVEYING HEAVY FLOWABLE MATERIALS

BACKGROUND TO THE INVENTION

The invention relates to multi-way valves for pumps for conveying heavy flowable materials of the kind having a shutter mechanism movable within a housing, the shutter mechanism having at one end at least one inlet which is movable across one or more housing openings and at the opposite end an outlet surrounded by a sealed contact joint which is movable across a delivery pipe opening in the housing, the contact joint surrounding the delivery pipe opening and contacting either the inside wall of the housing or a plate arranged on the inside wall of the housing in all intermediate and final positions of the control mechanism.

Multi-way valves of this kind control the flow of heavy flowable materials from a preliminary feed container to a drawing off delivery cylinder and from a compressing delivery cylinder to the delivery pipe. This invention relates more particularly, but not exclusively, to two-cylinder piston pumps in which the inlet and outlet of the shutter mechanism may be constituted by openings in two pipes which are coupled together and each define a respective conveying path, these pipes being jointly reciprocable either translationally or rotatably, in time with the piston stroke in the housing. Preferably, however, the invention is applicable to several embodiments of such multi-way valves, the shutter mechanisms of which at least partly combine the two conveying paths with each other and are either pivotable about an eccentric axis or movable translationally. The outlet, which has rounded off sides corresponding to the generally round interior opening of the delivery pipe, surrounds a surface which surrounds the delivery pipe in all phases of movement, so that the sealed contact joint does not overlap the edges of the delivery pipe opening.

Inside the shutter mechanism, the heavy flowable material undergoes excess pressure which, corresponding to the pressure in the delivery cylinders and the static pressure in the delivery pipe, is always greater than the pressure of the heavy flowable material surrounding the conveying device in the preliminary feed container, even when the column for conveying the heavy material is not in operation. The sealed contact joint must therefore be subjected to high pressure on its opposing sides in all phases of operation of the shutter mechanism in such a way that the overflowing of heavy material from the conveying device to the outside is avoided. This applies not only to the slurry contained in nearly all heavy flowable materials, but also to the particles which have an abrasive effect on the surfaces to be sealed. With regard to concrete, sand particles are the main concern. For this reason, the sealed contact joint is often not allowed to act directly on the inner face of the housing, but acts on a plate which is positioned on the housing wall. Nevertheless, it is claimed that, in spite of the abrasive particles in the heavy flowable material, a detrimental abrasion does not occur during sufficiently long operating times of the pump.

The invention proceeds from a previously known pump for heavy materials, which has a rotatable shutter as shutter mechanism which, as a result of the suitably adjusted varying distances of the inlet and outlet from the axis of the driving shaft, is related to a point on the shaft axis which is at least approximately free from momentum.

The outlet of the rotatable shutter has a kidney-shaped periphery which follows the sealing side of the sealed contact joint, so that this sealing side surrounds the delivery pipe opening but does not overlap its edges. With pumps for heavy flowable materials which, as a result of being extremely efficient, are suitable primarily for conveying concrete and mortar, the sealing of the outlet of the shutter mechanism has still presented a considerable problem.

The sealed contact joint is in the form of a hard seal, and cooperates with the hardened surface of the plate serving as protection against abrasion of the housing. However, it is still not possible to reduce the abrasive effect of the solid components of the heavy flowable material sufficiently for the desired working life of the apparatus to be obtained. The fine particles, that is in particular the sand particles in the case of concrete, penetrate between the surfaces which are to be sealed to each other and produce grooves in these surfaces which visibly increase during continuous operation of the pump, and which are responsible for very considerable abrasion of the sealed contact joint and wearing plate. This not only involves considerable expense in obtaining the necessary replacement parts, but also, in operation of such pumps, leads to leakages between the outlet of the rotatable shutter and the opening of the delivery pipe, which gives rise to breakdowns.

An object of the invention is therefore to reduce abrasion to a tolerable level by means of a multi-way valve of the kind described at the outset and to guarantee the sealing of the outlet of the rotatable shutter.

SUMMARY OF THE INVENTION

According to the invention, there is provided a multi-way valve for a pump for conveying heavy flowable materials having a shutter mechanism movable within a housing, the shutter mechanism having at one end at least one inlet which is movable across one or more housing openings and at the opposite end an outlet surrounded by a sealed contact joint which is movable across a delivery pipe opening in the housing, the contact joint surrounding the delivery pipe opening and contacting either the inside wall of the housing or a face plate arranged on the inside wall of the housing in all intermediate and final positions of the control mechanism, wherein the contact joint is in the form of a compressible sealing ring with a slotted or kidney-shaped cross-section which serves to wipe the flat and smooth face plate or inside wall of the housing, and is loaded with the internal pressure of the shutter mechanism and supported outwardly by a flange surrounding the outlet and extending in the conveying direction.

By allowing the wiper in the form of the compressible sealing ring to move in each direction of movement of the front face effecting the sealing, the wiper cooperating with the smooth and flat surface of the housing or wearing plate, the penetration of fine particles is prevented and, in this way, the creation of grooves is avoided. By this means, one can make use of the fact that the surrounding edges of the outlet of the shutter mechanism do not overlap the edges of the delivery pipe opening in the housing or the wearing plate, but act on the total surface which is the sum of the two joint surfaces surrounded by the sealed contact joint in the two final or control positions of the control mechanism, proceeding from the delivery pipe opening, whilst carrying out the sealing operation, so that the wiper is not harmed by the disintegration of particles, that is the sand grains in the case of concrete, between the edges of the openings. Even after long periods of use, it can be observed that the grooves produced by certain production methods of the compressible sealing ring, these being subject to the manufacturing technique, are still present in their original form in the sealing surface of the compressible sealing ring, so that there is no measurable abrasion of the commmpressible sealing ring. This result is all the more unexpected since, as a result of the kidney shape or slotted shape of the outlet of the shutter mechanism, during the rotational or translational movement of the shutter mechanism the sealed contact joint executes practically no wiping movement along the curved or straight longitudinal edges of the joint surfaces, this wiping movement being carried out practically only along the short, usually semicircular, curved transverse edges on the total surface, so that, in spite of its overall uniform cross-section, the sealed contact joint is variably loaded on certain parts of its extent according to the various operations.

The sealing effect results from the internal pressure which is transformed into axial forces acting on a radial joint surface on the rear side of the compressible sealing ring in the flange, whereby the compressible sealing ring is maintained in a prestressed state in the conveying direction on the wearing plate or the corresponding housing wall, dependent on the internal pressure. On the other hand, the internal pressure presses the compressible sealing ring outwards on to a seating axially formed there. Thus the compressible sealing ring is protected from being squeezed out of its seating in the flange.

Preferably, according to the invention, the compressible sealing ring is formed with wipers operating according to their various functions and/or sealing edges or lips. This can be achieved with a sealing ring which is rectangular in cross-section, but also with lip sealing rings with correspondingly complex cross-sections.

With extremely high discharge pressures it has proved to be appropriate to counteract the shifting of the compressible sealing ring between the front face of the flange and the opposing face on the housing or wearing plate with an outer thrust ring. A metallic thrust ring can also prove to be useful on the radial rear side of the compressible sealing ring, since it imparts natural stability to the sealing ring, whereby an inner projection of the flange becomes superfluous, this projection otherwise being necessary for holding the sealing ring in position.

According to another embodiment of the invention, a seating ring can be provided between the compressible sealing ring and the radial flange surface, on which seating ring the radial seating surface and an inner axial support surface for the compressible sealing ring are formed. Such a seating ring can considerably facilitate the replacement of the compressible sealing ring.

BRIEF DESCRIPTION OF THE DRAWINGS

In order that the invention may be more fully understood, reference will now be made, by way of example, to the accompanying drawings, in which:

FIG. 1 is a plan view of the outlet of the shutter mechanism of a first embodiment as a reproduction of the rotation zone;

FIG. 2 is a part-section through the outlet of the shutter mechanism and the parts attached to this, the section being taken along the line B—B in FIG. 1;

DETAILED DESCRIPTION OF THE DRAWINGS

Figure 3:
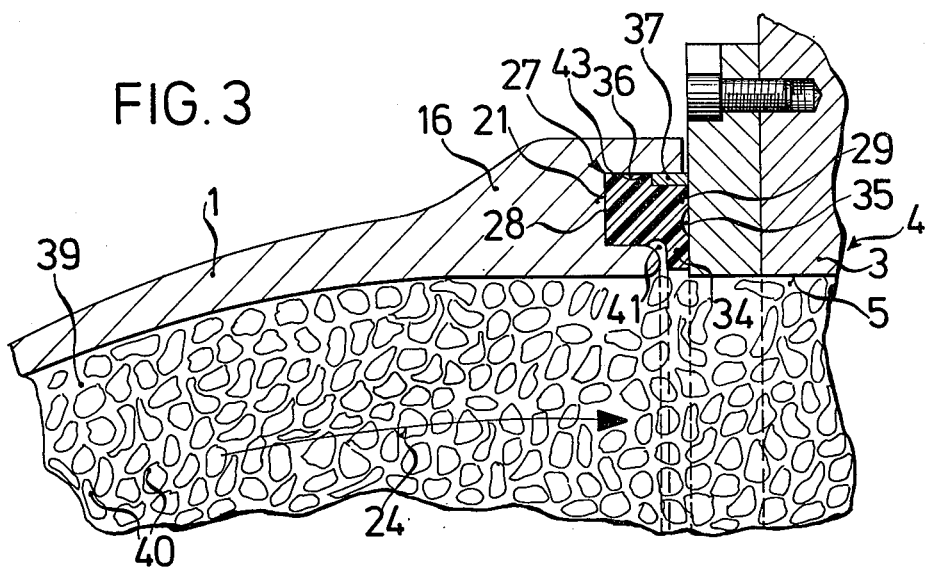
FIG. 3 is a part-section, similar to that of FIG. 2, of a modified embodiment of the invention.

Referring to FIGS. 1 and 2, a shutter mechanism 1 is pivotal by means of a shaft, which is not shown, about a geometrical axis as is shown at 2 in FIG. 1, the shutter mechanism 1 being attached to this shaft by an arm. The angle of pivotal movement is shown by the double arrow. The shutter mechanism 1 forms a rotatable shutter which alternately connects a delivery pipe opening 5 formed in a wall 3 of a housing 4 with two openings, which are not shown, forming the discharge openings of two delivery cylinders. These openings and the outlet opening are radially spaced from the shaft axis 2.

The rotatable shaft, which is not shown, is axially supported, and the distances of the shutter mechanism inlet coupled to the delivery cylinders and of the control mechanism outlet, which can be seen at 6 in FIG. 2, from the shaft axis 2 are different, and are chosen so that the distance of the inlet from the axis 2 is greater than the distance of the outlet from the axis 2.

Moreover, in the shutter mechanism 1 the outlet is kidney-shaped, that is the parallel longitudinal edges of the outlet are uniformly curved and are connected with each other by short transverse edges 30 and 31 having the same radius of curvature as the adjacent opening. In the righthand control position, the position of the outlet is shown by broken lines 7 in FIG. 1. An area 8 defined by the double broken lines 7 is thus overlapped by the outlet of the rotatable shutter in this control position, whilst in the other control position, that is in the lefthand control position, an area 10 defined by the solid lines 9 is overlapped by the outlet. The two control positions lie at the limits of the pivotal movement of the rotatable shutter shown in FIG. 1 by the double arrow.

As can be seen in FIG. 2, a preferably polished face plate 12 is arranged on the inside wall 11 of the housing 4, and is screwed to the housing wall 3 by means of several countersunk screws 14. The face plate 12 is formed with an aperture 15 corresponding to the delivery pipe opening 5 in the housing 4.

The delivery pipe end of the shutter mechanism 1 has a flange 16 provided with a recess 17 in its front face. The recess 17 comprises a radial surface 18 and an axial surface 19 orthogonal to the radial surface 18. A seating ring 20 is supported by a radial outer surface 21 and an axial outer surface 22 of the ring 20 on the surfaces 18 and 19 of the recess 17. It has an axial or flange 23 extending in the conveying direction shown by the arrow 24 or in the direction of the delivery pipe opening 5. With its axial outer surface 25 this projection 23 supports an axial seating surface 26 of a compressible sealing ring 27 whose radial seating surface 28 is supported by an adjacent radial surface of the seating ring 20. This compressible sealing ring 27 is indicated by the solid lines 9 in FIG. 1. In the embodiment according to FIGS. 1 and 2, the sealing ring 27 is formed with a lip 29 on its outer surface which wipes the areas 8 and 10 in the vicinity of the curves 30 and 31, these areas being formed in both cases by the surface 32 of the face plate 12. At least in the vicinity of the areas 8 and 10, but preferably on the whole of the inner surface 32, the surface of the face plate 12 is flat and smooth. If the face plate 12 is dispensed with, the inside wall 11 of the housing 3 can be polished, preferably after hardening. If necessary, it is recommended that at least the areas 8 and 10 should be chrome-plated.

Instead of the kidney-shaped outline, which is shown at 7 and 9 in FIG. 1, a slotted-shaped outline of the areas 8 and 10 may be acceptable with other forms of pump for conveying heavy flowable materials.

Whilst the lip 29 is arranged radially outwards and exerts only a cleaning function by wiping the surfaces, the compressible sealing ring 27 also has an inner sealing lip 34 which performs not only a cleaning function but also a sealing function. In both FIG. 2 and FIG. 3, the compressible sealing ring 27 is shown in its assembled position, in which the lips 29 and 34 are already flattened as a result of the structural prestressing of the sealing ring 27. However, the hollow channels 35, 36 can be seen which are used to form the lips. In the embodiment shown in FIG. 3, an outer radial thrust ring 37 is provided, which consists of harder material than the compressible sealing ring 27. For this thrust ring 37, a hardened, polymerised or polymerisable, non-permanent thermoplastic synthetic resin (polyolefin) is preferably used. The compressible sealing ring 27, on the other hand, is preferably made of an elastomer or of leather, and more particularly of a material having rubber-like flexibility, such as natural rubber, synthetic rubber and materials similar to rubber, which can be reinforced by fillers.

The flow medium 40, such as concrete, in the interior 39 of the shutter mechanism 1 is under high pressure which, in the embodiments shown in FIGS. 2 and 3, is formed behind the lip 34 in a hollow channel 41, and is exerted on the radial surface 21 of the recess 17 of the flange 16 and on the radial surface of the seating ring 20. There it loads the radial surface 28 of the sealing ring 27, which is accordingly prestressed in the conveying direction 24 or in the direction of the delivery pipe opening 5. This pressure is taken up on the axial surface 43 of the recess 17 in the flange 16 in the radial direction.

A metallic thrust ring, which is not shown, for improving the rigidity can be placed on the radial surface 28 of the sealing ring 27, and can be used either together with or without the thrust ring 37.

Figure 4:
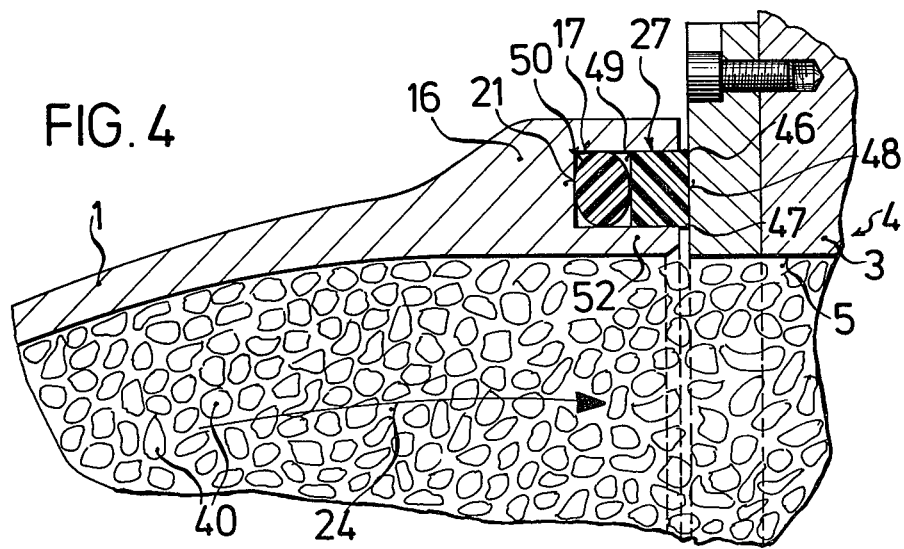
FIG. 4 is a part-section, again similar to that of FIG. 2, of a further modified embodiment of the invention.

According to the embodiment shown in FIG. 4, a rectangular cross-section compressible sealing ring 27 is used, the outer axial edge 46 of which performs a cleaning function, whilst the inner axial edge 47 performs both cleaning and sealing functions. These edges define the outer radial surface 48 of the compressible sealing ring 27. The inner radial parallel surface 49 serves to support an O-ring 50 which for its part is supported on the radial surface 21 of the recess 17. In the embodiments according to FIGS. 3 and 4, the flange 16 is integrally formed with an intermediate annular flange 52 which corresponds to the axial projection or annular flange 23 of the seating ring 20 of FIG. 2.

When in operation, the shutter mechanism reciprocates between the two control positions shown by the double arrow in FIG. 1 in time with the pistons in the two delivery cylinders. The compressible sealing ring 27 is a sealed contact joint, which first wipes the flat and smooth wearing plates and the housing surface areas 8 and 10 with the kidney-shaped outline 7 and 9 shown in FIG. 1, before the lip 34 29 loaded with the internal pressure of the shutter mechanism effects a seal, lips 29 and 34 being supported on the surface areas 8 and 10. The compressible sealing ring 27 has an overall uniform cross-section, that is an overall uniform outline and an overall uniform cross-sectional surface, if one considers its condition before assembly.

I claim:

1. A multi-way valve for a pump for conveying heavy flowable materials having a shutter mechanism movable within a housing, the shutter mechanism having at one end at least one inlet which is movable across one or more housing openings and at the opposite end an outlet surrounded by a sealed contact joint which is movable across a delivery pipe opening in the housing, the contact joint surrounding the delivery pipe opening and contacting either the inside wall of the housing or a face plate arranged on the inside wall of the housing in all intermediate and final positions of the shutter mechanism, wherein the contact joint is in the form of a compressible sealing ring with a slotted or kidney-shaped cross-section which serves to wipe the flat and smooth face plate or inside wall of the housing, and is loaded with the internal pressure of the shutter mechanism and supported outwardly by a flange surrounding the outlet and extending in the conveying direction.

2. A multi-way valve according to claim 1, wherein the compressible sealing ring has an outer edge which performs a cleaning function during wiping and an inner edge or lip which performs a cleaning and sealing function.

3. A multi-way valve according to claim 1, wherein an outer thrust ring is provided on the compressible sealing ring.

4. A multi-way valve according to claim 1, wherein a thrust ring is supported on a radial surface of the compressible sealing ring.

5. A multi-way valve according to claim 1, wherein a recess is formed in the flange with an inner radial surface and an outer axial surface orthogonal to the inner surface, and also an inner axial annular flange.

6. A multi-way valve according to claim 1, wherein a seating ring is supported within the recess on the inner radial surface and the outer axial surface, and the seating ring forms a structural unit with the inner axial annular flange.

7. A multi-way valve according to claim 1, wherein the sealing ring is axially prestressed by an O-ring.

* * * * *